(12) United States Patent  
Wener

(10) Patent No.: US 8,918,292 B2  
(45) Date of Patent: Dec. 23, 2014

(54) DIGITAL ANGLE METER

(71) Applicant: Brown Line Metal Works, LLC, Chicago, IL (US)

(72) Inventor: James Wener, Chicago, IL (US)

(73) Assignee: Brown Line Metalworks, LLC

(\*) Notice: Subject to any disclaimer, the term of this patent is extended or adjusted under 35 U.S.C. 154(b) by 0 days.

(21) Appl. No.: 14/046,677

(22) Filed: Oct. 4, 2013

(65) Prior Publication Data

US 2014/0039810 A1     Feb. 6, 2014

Related U.S. Application Data

(63) Continuation-in-part of application No. 13/241,660, filed on Sep. 23, 2011.

(51) Int. Cl.
| | |
|---|---|
| *G01L 1/00* | (2006.01) |
| *B25B 13/00* | (2006.01) |
| *B25B 23/14* | (2006.01) |
| *G01B 5/24* | (2006.01) |
| *B25B 23/142* | (2006.01) |

(52) U.S. Cl.
CPC .............. *G01B 5/24* (2013.01); *B25B 23/1425* (2013.01)
USPC ............................... 702/41; 7/138; 73/862.23

(58) Field of Classification Search
CPC ........... G01B 5/24; G01B 21/22; G01L 5/24; B25B 23/14; B25B 13/462; B25B 23/1427; B25B 23/147; B25B 23/1405
USPC ........... 702/41, 33, 113, 150–151; 73/862.08, 73/862.23; 173/5, 176, 183; 7/138
See application file for complete search history.

(56) References Cited

U.S. PATENT DOCUMENTS

| | | |
|---|---|---|
| 2,889,729 A | 6/1959 | Orner |
| 4,091,664 A | 5/1978 | Zerver |

(Continued)

FOREIGN PATENT DOCUMENTS

| | | |
|---|---|---|
| DE | 29622317 U1 | 11/1997 |
| DE | 10219568 A1 | 3/2003 |

(Continued)

OTHER PUBLICATIONS

Partial International Search Report for Application No. PCT/US2012/056510 issued Dec. 21, 2012.

(Continued)

*Primary Examiner* — Toan Le  
(74) *Attorney, Agent, or Firm* — Marshall, Gerstein & Borun LLP

(57) ABSTRACT

An angle measuring device or system can include a wrench and a digital angle meter. The wrench can include a head for engaging a fastening device, a central axis about which the wrench or bracket rotates during use, and a longitudinal axis perpendicular to the central axis. The digital angle meter can be attached to the wrench or bracket and include a housing, a processor, and at least one gyrometer. The at least one gyrometer including a first axis extending parallel to the longitudinal axis for determining the rotational orientation of the wrench or bracket relative to a reference position. A sensor of the digital angle meter allows for an automated and accurate calculation of a total angle of rotation of the nut or bolt about the central axis using a ratcheting wrench.

26 Claims, 11 Drawing Sheets

(56) References Cited

U.S. PATENT DOCUMENTS

| | | |
|---|---|---|
| 4,265,109 A | 5/1981 | Hallbauer et al. |
| 4,314,490 A | 2/1982 | Stone |
| 4,664,001 A | 5/1987 | Denman |
| 4,760,746 A | 8/1988 | Kruse et al. |
| 4,958,541 A | 9/1990 | Annis et al. |
| 5,172,616 A | 12/1992 | Negishi |
| 5,476,014 A | 12/1995 | Lampe et al. |
| 5,533,409 A | 7/1996 | Crane et al. |
| 5,589,644 A | 12/1996 | Becker et al. |
| 6,070,506 A | 6/2000 | Becker |
| 6,276,243 B1 | 8/2001 | Jenkins |
| 6,345,436 B1 | 2/2002 | Codrington |
| 6,571,646 B1 | 6/2003 | Truesdell |
| 6,629,055 B2 | 9/2003 | McGee et al. |
| 6,965,835 B2 | 11/2005 | McGee et al. |
| 6,968,759 B2 | 11/2005 | Becker et al. |
| 7,082,866 B2 | 8/2006 | Becker |
| 7,089,834 B2 | 8/2006 | Reynertson et al. |
| 7,234,378 B2 | 6/2007 | Reynertson, Jr. |
| 7,313,990 B1 | 1/2008 | Shiao |
| 7,367,250 B2 * | 5/2008 | Rainone et al. ............ 81/478 |
| 7,415,897 B2 | 8/2008 | Shiao |
| 7,448,284 B2 | 11/2008 | Hsieh |
| 7,458,297 B1 | 12/2008 | Shiao |
| 7,562,589 B2 | 7/2009 | Anjanappa et al. |
| 7,565,844 B2 | 7/2009 | Crass et al. |
| 7,823,465 B2 | 11/2010 | Makimae et al. |
| 7,841,100 B2 | 11/2010 | Lucke |
| 2003/0065474 A1 | 4/2003 | McGee et al. |
| 2005/0223856 A1 | 10/2005 | Reynertson et al. |
| 2009/0078057 A1 | 3/2009 | Schultz et al. |
| 2009/0084232 A1 | 4/2009 | Makimae et al. |
| 2009/0249924 A1 | 10/2009 | Lin |
| 2010/0199782 A1 | 8/2010 | Hsieh |
| 2011/0291647 A1 | 12/2011 | Lee et al. |
| 2013/0080110 A1 | 3/2013 | Wener |

FOREIGN PATENT DOCUMENTS

| | | |
|---|---|---|
| DE | 202004017472 U1 | 1/2005 |
| DE | 202007002793 U1 | 5/2007 |
| DE | 102007055028 A1 | 5/2009 |
| EP | 1022097 A2 | 7/2000 |
| EP | 2147751 A1 | 1/2010 |
| EP | 2394792 A1 | 12/2011 |
| GB | 2273574 A | 6/1994 |
| TW | 201003765 A | 10/2010 |
| WO | WO-96/16761 A1 | 6/1996 |

OTHER PUBLICATIONS

International Search Report for Application No. PCT/US12/056510 dated Feb. 27, 2013.

Written Opinion for Applicaiton No. PCT/US12/056510 dated Feb. 27, 2013.

International Preliminary Report on Patentability for Application No. PCT/US2012/056510 dated Mar. 25, 2014.

* cited by examiner

DIGITAL ANGLE METER

CROSS-REFERENCE TO RELATED APPLICATIONS

This is a continuation-in-part of U.S. patent application Ser. No. 13/241,660, filed Sep. 23, 2011, the entire contents of which are hereby incorporated by reference.

FIELD OF THE DISCLOSURE

The present disclosure is directed to an angle meter and, more particularly, to a digital angle meter.

BACKGROUND

Conventionally, when determining top dead center, cam centerline, or cam duration, for example, of an internal combustion engine, technicians use degree wheels. Degree wheels are large preprinted discs with graduated markings showing degrees of rotation. These wheels are fixed to the engine block and the technician can then rotate the crankshaft with a tool to record the necessary measurements. Similarly, when using a torque wrench, technicians are often required to measure the degree of rotation of a nut or bolt, for example, after applying some known quantity of torque. These measurements can be taken through the use of a mechanical angle gauge/dial. Using a degree wheel for measuring crankshaft position and a mechanical angle gauge/dial for measuring degree of rotation of a torque wrench is time consuming and tedious.

SUMMARY

One aspect of the present disclosure provides for a method of calculating a total angle of rotation of a wrenching device used to apply a torque to a fastening device rotating about a longitudinal axis. The wrenching device includes a digital angle meter including a gyrometer, a processor, a memory, and logic stored on the memory. The method includes detecting a first rotation of the wrenching device about the longitudinal axis in a first direction from a reference angle position to a first angle position, wherein a first angle between the reference angle position and the first angle position is stored on the memory of the digital angle meter. The first rotation is detected by the gyrometer of the digital angle meter. The method further includes detecting a third rotation of the wrenching device about the longitudinal axis in the first direction from the second angle position to a third angle position until engaging a first resistance position, wherein a third angle is formed between the second angle position and the third angle position. The third rotation is detected by the gyrometer of the digital angle meter. The method also includes detecting a fourth rotation of the wrenching device about the longitudinal axis in the first direction from the third angle position to a fourth angle position, wherein a fourth angle between the third angle position and the fourth angle position is stored on the memory of the digital angle meter. The fourth rotation is detected by the gyrometer of the digital angle meter. The method additionally includes calculating a first aggregate angle of rotation by adding the first angle to the fourth angle, wherein the total angle of rotation is the first aggregate angle of rotation.

A further aspect of the present disclosure provides for a method of calculating a total angle of rotation of a wrenching device used to apply a torque to a fastening device rotating about a longitudinal axis. The wrenching device includes a digital angle meter including a gyrometer, a processor, a memory, and logic stored on the memory. The method includes detecting a rotation of the wrenching device about the longitudinal axis in a first direction from a reference angle position to a first angle position, wherein a first angle between the reference angle position and the first angle position is stored on the memory of the digital angle meter, and wherein a rotation of the fastening device in the first direction results in a tightening of the fastening device. The method further includes detecting a rotation of the wrenching device about the longitudinal axis in a second direction opposite to the first direction from the first angle position to a second angle position, wherein a second angle is formed between the first angle position and the second angle position. The method additionally includes detecting a rotation of the wrenching device about the longitudinal axis in the first direction from the second angle position to a third angle position, wherein a third angle between the second angle position and the third angle position is stored on the memory of the digital angle meter. The method further includes calculating a first aggregate angle of rotation by adding the first angle to the third angle, wherein the total angle of rotation is the first aggregate angle of rotation.

An additional aspect of the present disclosure provides for a non-transitory computer-readable medium storing instructions to calculate a total angle of rotation of a wrenching device used to apply a torque to a fastening device rotating about a longitudinal axis. The instructions when executed by a processor cause the processor to detect with a gyrometer of a digital angle meter a first rotation of the wrenching device about the longitudinal axis in a first direction from a reference angle position to a first angle position. The instructions also cause the processor to store a first angle between the reference angle position and the first angle position on a memory of the digital angle meter. The instructions additionally cause the processor to detect with the gyrometer of the digital angle meter a second rotation of the wrenching device about the longitudinal axis in a second direction opposite to the first direction from the first angle position to a second angle position, wherein a second angle is formed between the first angle position and the second angle position. The instructions further cause the processor to detect with the gyrometer of the digital angle meter a third rotation of the wrenching device about the longitudinal axis in the first direction from the second angle position to a third angle position until engaging a first resistance position, wherein a third angle is formed between the second angle position and the third angle position. The instructions also cause the processor to detect with the gyrometer of the digital angle meter a fourth rotation of the wrenching device about the longitudinal axis in the first direction from the third angle position to a fourth angle position, and to store a fourth angle between the third angle position and the fourth angle position on the memory of the digital angle meter. The instructions additionally cause the processor to calculate a first aggregate angle of rotation by adding the first angle to the fourth angle, wherein the total angle of rotation is the first aggregate angle of rotation.

DETAILED DESCRIPTION

The present disclosure is directed to new and improved devices, systems, and methods for measuring angles of rotation, for example, of torque wrenches, crankshafts, and other rotatable components, and for performing algorithms for the automatic determination of various calculations and measurements. This is achieved through novel configurations of electronics and/or structural components including, for example, one or more gyrometers and processors carried within a uniquely designed housing that promotes adaptability, flexibility, usability, compactness, and accuracy. More particularly, a digital angle meter of the present disclosure allows for a fully or partially automated accurate calculation of a total angle of rotation of a nut or bolt about its longitudinal axis using a ratcheting wrench.

Figure 1:
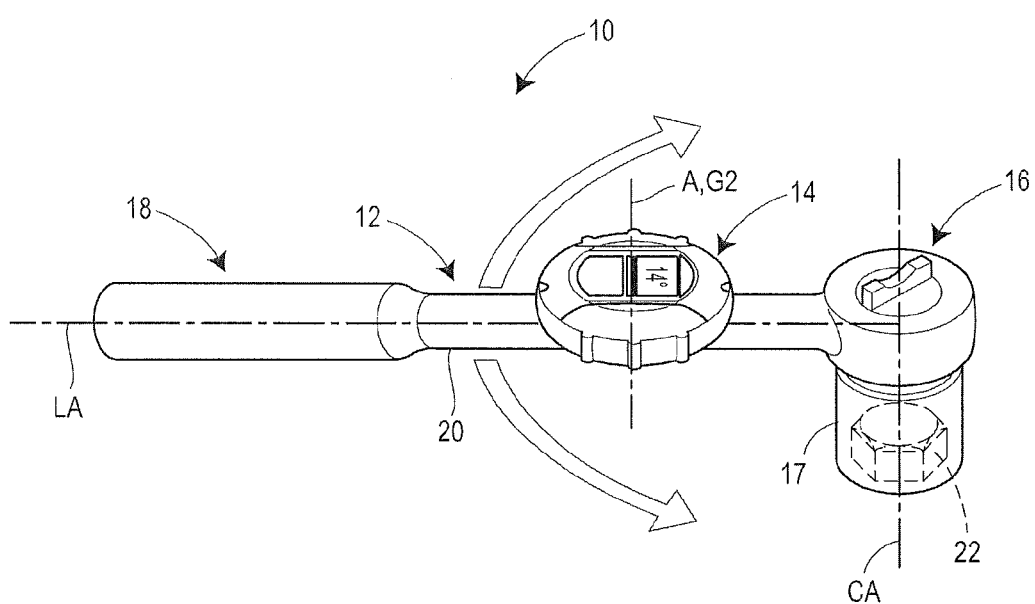
FIG. 1 is a perspective view of a wrenching device constructed in accordance with the principles of the present disclosure.

Referring now to FIG. 1, one version of a wrenching device 10 constructed in accordance with the teachings of the present disclosure is illustrated. The wrenching device 10 of the version depicted in FIG. 1 includes a wrench 12 and a digital angle meter 14 removably connected to the wrench 12. The wrench 12 includes a head 16, a handle 18, and a stem 20. The head 16 includes a socket 17 defining a recess 22 for engaging a crankshaft or a fastening device, such as nut, a bolt, or a screw, for example, and can include a conventional ratchet mechanism or a breaker bar, for example, for facilitating manipulation of the nut, bolt, screw, or crankshaft. As such, the recess 22 can have a hexagonal cross-section, for example, or any cross-section required to engage a crankshaft or other nut or bolt or screw shape. The stem 20 includes an elongated member extending between the head 16 and the handle 18. The stem 20 can include a circular cross-section. The handle 18 also includes an elongated member and is adapted to be grasped by a user during use. Accordingly, the handle 18 can include a knurled surface or some other surface treatment to minimize slippage. In one version, the head 16, handle 18, and stem 20 are constructed from a metallic material such as steel, for example, similar to conventional wrenches, ratchets, torque wrenches, etc.

As shown in FIG. 1, the head 16 of the wrench 12 has a central axis CA about which the wrench 12 rotates during use. Additionally, the stem 20 and the handle 18 extend along a common longitudinal axis LA of the wrench 12. The longitudinal axis LA of the wrench 12 depicted in FIG. 1 is perpendicular to the central axis CA of the head 16. However, the wrench 12 may be configured such that the longitudinal axis LA is disposed at any angle transverse to the central axis CA. In some versions, the head 16 may swivel, rotate, or otherwise pivot relative to the stem 20 and handle 18 such that the angular relationship between the longitudinal axis LA and the central axis CA can vary and does not necessarily have to be perpendicular.

Still referring to FIG. 1, the digital angle meter 14 is removably attached to the stem 20 of the wrench 12 between the head 16 and the handle 18. Said another way, the digital angle meter 14 is removably attached to the wrench 12 at a location that is offset from and spaced from the central axis CA of the head 16. This placement of the digital angle meter 14 does not interfere with the dimensions of the head 16 such that the head 16 can operate within tight spaces in an engine compartment, or other tightly constrained working environment, for example.

Figure 2:
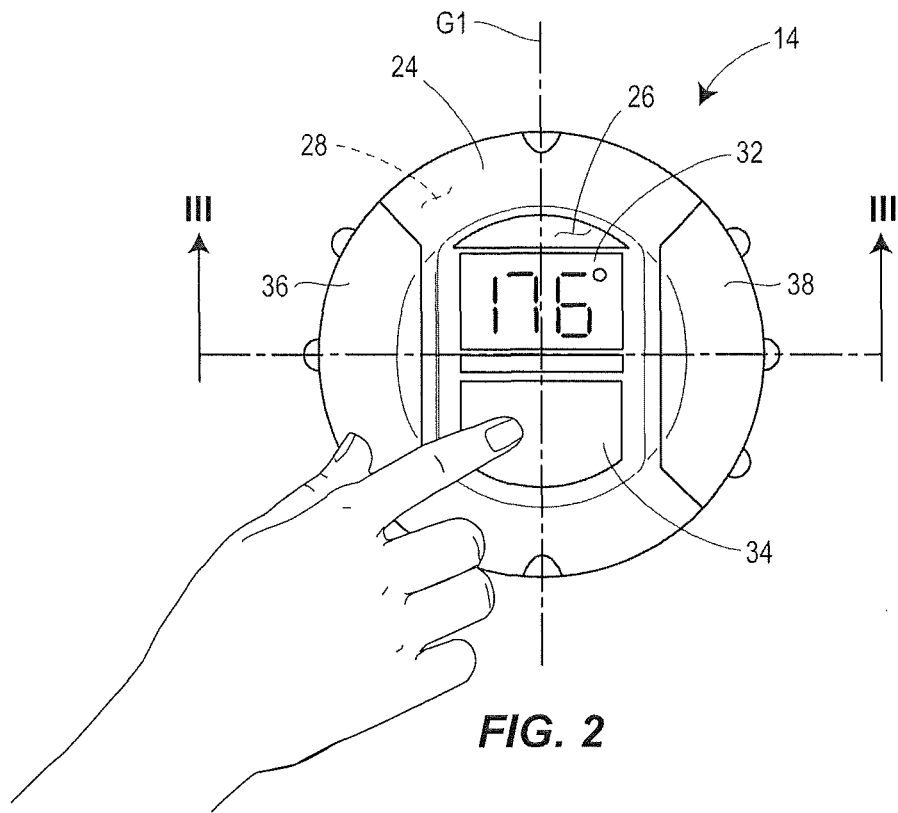
FIG. 2 is a top view of a digital angle meter constructed in accordance with the present disclosure.
Figure 3:
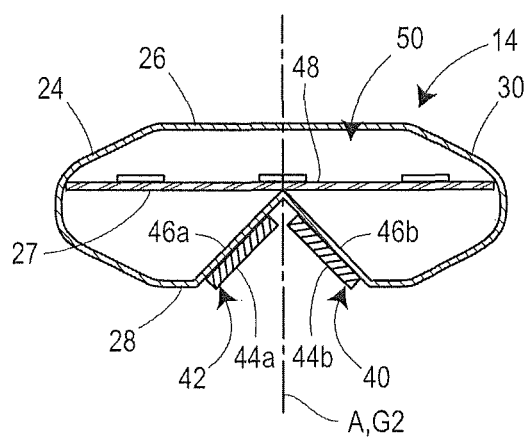
FIG. 3 is a cross-sectional view of the digital angle meter of FIG. 2.
Figure 4:
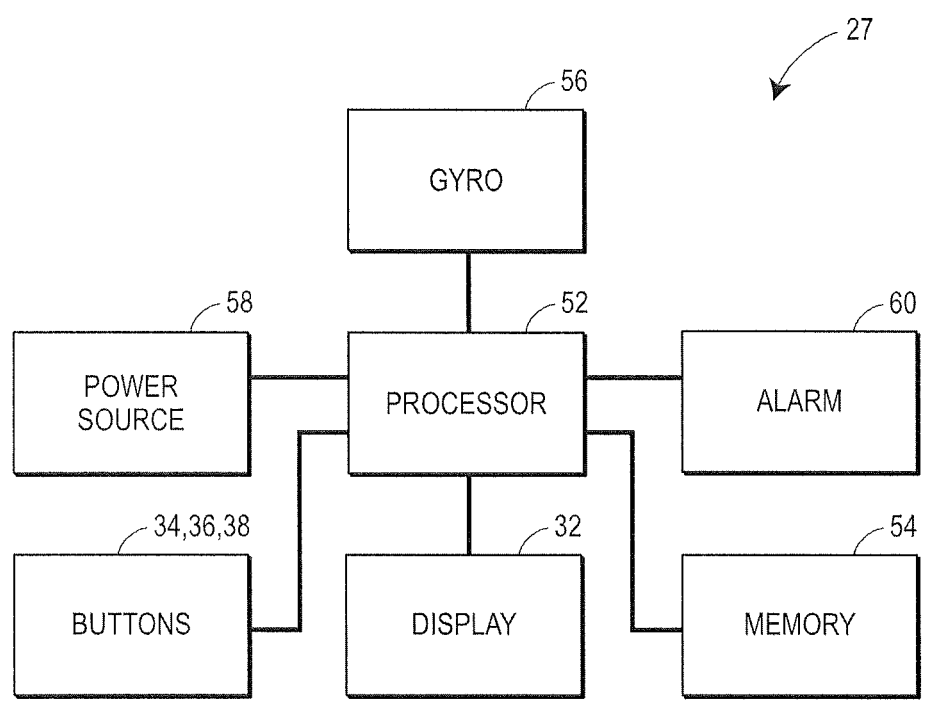
FIG. 4 is a block diagram of an electrical circuit of the digital angle meter of FIG. 2.

Referring now to FIGS. 2-4, the digital angle meter 14 is maintained within a housing 24 and includes an electrical circuit 27 (shown in FIG. 4) for performing various tasks, as will be described herein. The housing 24 can be constructed of plastic or some other impact resistant type material and, as depicted in FIGS. 2 and 3, is a disc-shaped structure including opposing first and second faces 26, 28 and a perimeter 30 connecting the first and second faces 26, 28. The first face 26 carries a digital display 32 and a "Selector" button 34. The perimeter 30 carries an "Up" button 36 and a "Down" button 38 at locations adjacent to the first face 26. These buttons 34, 36, 38 are operable in conjunction with the electrical circuit 27 to instruct operation of the digital angle meter 14. Other configurations of the buttons 34, 36, 38 and display 32 of course can also be included within the scope of the present disclosure.

As shown in the cross-sectional representation illustrated in FIG. 3, the digital angle meter 14 includes an elongated groove 40 in the second face 28 of the housing 24. The elongated groove 40 is shaped and configured to receive the stem 20 of the wrench in FIG. 1, for example. In this version, the elongated groove 40 extends continuously and entirely through a center of the second face 28 of the housing 24 so as to avoid any interference when receiving the stem 20 of the wrench 12 or other such support member, for example. When the stem 20 is disposed within the elongated groove 40, the digital angle meter 14 is restricted from rotating about an axis A that extends through the housing 24, as shown in FIG. 3, and perpendicular to the groove 40.

To further facilitate the attachment of the digital angle meter 14 to the wrench 12 of FIG. 1, for example, the digital angle meter 14 includes an attachment mechanism 42 adjacent to the elongated groove 40. The attachment mechanism 42 can include at least one magnet, a piece of adhesive material, or other means for maintaining the proximity of the digital angle meter 14 relative to the wrench 12. In FIG. 3, the elongated groove 40 includes a V-shaped cross-section and the attachment mechanism 42 includes first and second elongated magnets 44a, 44b attached to opposing first and second sidewalls 46a, 46b, respectively, of the v-shaped groove 40. The magnets 44a, 44b can be constructed of any conventional magnetic material including, for example, Neodymium 35.

While the housing 24 of the presently disclosed angle meter 14 includes the elongated groove 40, the angle meter 40 can be manufactured without the groove 40, if desired. Moreover, while the groove 40 has been described as having a cross-section that is V-shaped in FIG. 3, it could also be U-shaped, square, or have generally any other shape capable of serving the intended purpose of receiving a support member such as the stem 20 of the wrench 12 of FIG. 1.

Referring now to FIGS. 3 and 4, the electrical circuit 27 of the digital angle meter 14 includes a circuit board 48 and a plurality of electrical components 50 mounted to the circuit board 48. The plurality of components 50 include a processor 52, a memory 54 (i.e., a computer readable storage medium) electrically connected to the processor 52 (i.e., a computer), and at least one gyrometer 56 electrically connected to the processor 52. The processor 52 is also electrically connected to the buttons 34, 36, 38 and the display 32 discussed above in reference to FIG. 2. Additionally, as shown in FIG. 4, the processor 52 is electrically connected to a power source 58 and an alarm 60. In the disclosed version of the digital angle meter 14, the at least one gyrometer 56 includes at least a first gyrometer axis G1, as shown in FIG. 3. The first gyrometer axis G1 extends through the digital angle meter 14 and parallel to the longitudinal axis LA of the wrench 12 during use. As such, the at least one gyrometer 56 can determine an angle of the wrench 12 relative to a reference position, during use, based on the first gyrometer axis G1.

The digital angle meter 14 can also optionally include a second gyrometer axis G2 that is perpendicular to the first gyrometer axis G1 for determining a position of the digital angle meter 14 relative to the stem 20 of the wrench 12. That is, during use of the device of FIG. 1, for example, the second gyrometer axis G2 should be parallel to the central axis CA of the head 16 of the wrench 12. However, due to the construct of the elongated grove 40, it is possible for the digital angle meter 14 to roll or pitch relative to the stem 20. As such, the at least one gyrometer 56 utilizes the second gyrometer axis G2 to determine to what extent the digital angle meter 14 has rolled or pitched relative to the stem 20. This determination can assist with the accuracy of the determination of the angle of the wrench 12 about the central axis CA of the head 16. However, the second gyrometer axis G2 is not necessary in all applications. The at least one gyrometer 56 can include more than two axes and can include any form of electronic gyroscope, for example, including but not limited to a MEMS gyroscope. Examples of suitable gyrometers include a CMR3000 series gyroscope available from VTI Technologies and INVENSENSE MPU3050 3-Axis MEMS Gyroscope, each of which includes a commercially available three-axis gyroscope. While these gyroscopes include three axes, based on the foregoing description, not necessarily all three would be used.

As mentioned above, the digital angle meter 14 further includes the memory 54 electrically connected to the processor 52. The memory stores logic executable by the processor 54 for performing a number of calculations based on information received from the at least one gyrometer 56 such as the angle of the wrench 12 relative to a reference position. The digital display 32 can then display that angle and/or the result of a related calculation. Finally, as mentioned, the digital angle meter 14 of the present disclosure includes the alarm 60, which is controlled by the processor to emit an alarm signal upon the occurrence of a predetermined condition such as when the wrench 12 of FIG. 1, for example, occupies a predetermined angle. The alarm 60 may include an audible alarm, a visual alarm, or a combination of both. That is, the alarm 60 can include beeps, flashing lights, or any other type of alarm including a vibratory mechanism or other tactile alarm.

Figure 5:
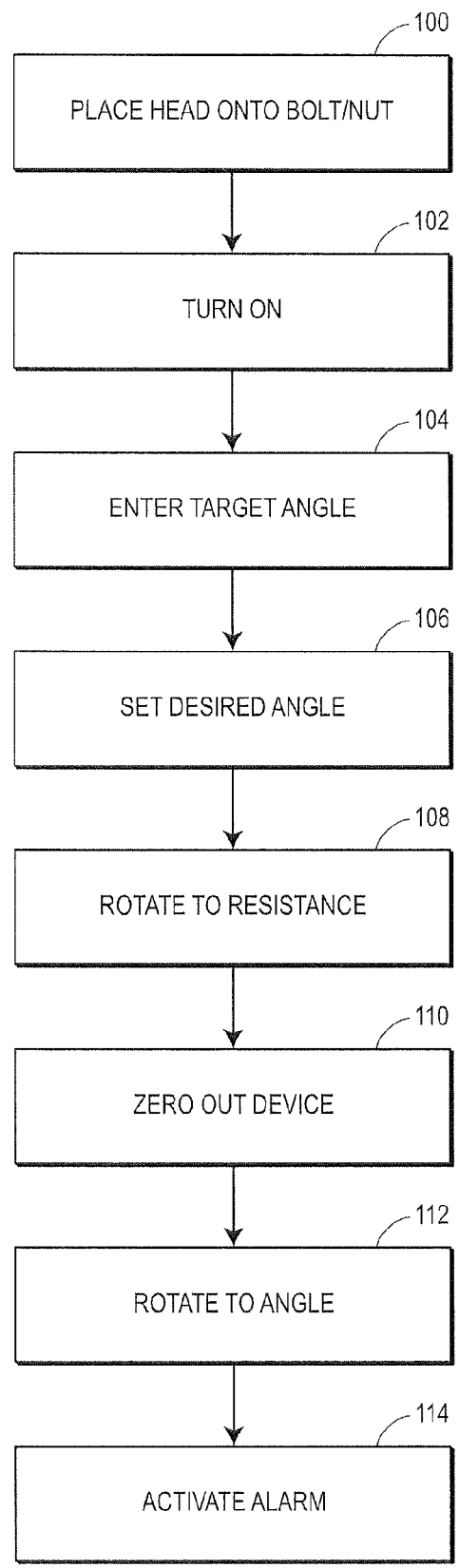
FIG. 5 is a flowchart representative of a method of using the wrenching device in FIG. 1 as a torque wrench.

As mentioned, the device 12 of FIG. 1 can be used as a conventional wrench. To do so, a user first places the head 16 of the wrench 12 onto a nut or bolt to be tightened, as indicated by block 100 in FIG. 5. The, at block 102, the user can depress and hold the "Selector" button 34 for a number of seconds until the display 32 illuminates to indicate that the digital angle meter 14 is powered on. Using the "Up" and "Down" buttons, the user can then enter a desired angle for the nut or bolt to be turned past resistance, as shown at block 104. While the user manipulates the "Up" and "Down" buttons, the digital display 32 reads out the angle number. When the desired angle is displayed on the digital display 32, the user can depress the "Selector" button 34 to set the displayed angle, as shown at block 106. Then, as indicated by block 108 in FIG. 5, the user begins to rotate the wrench 12 around the central axis CA of the head 16, until the user senses resistance. Upon reaching a point where resistance is sensed, the user then again depresses the "Selector" button 34 to zero out the digital display 32 on the angle meter 14, as shown at block 110. Then, as indicated by block 112, the user further rotates the wrench 12 around the central axis CA and tightens the nut or bolt until the digital display 32 displays the desired angle, which was pre-set at block 106.

As the user rotates the wrench 12, the electrical circuit 27 continuously measures the angle of rotation of the wrench 12, relative to the zeroed out position, and displays the angle on the digital display 32. The digital display 32 can be configured to only display the angle of rotation in the positive direction away from the zeroed out position. That is, if the wrench 12 includes a ratcheting functioning, negative rotation back toward the zeroed out position of the wrench 12 should not be indicated on the display 32. The electrical circuit 27 can be programmed to automatically detect and ignore negative rotation sensed by the gyrometer 56, or this function can be manually operated. For example, during a manual operation, prior to initiating negative rotation, the user can depress the "Selector" button 34, or another button, to freeze the display and instruct the electrical circuit 27 to ignore the forthcoming negative rotation. Upon the wrench 12 being ratcheted back in the negative direction and into its desired position, the user can then again move the ratchet in the positive direction until resistance is reached. Upon reaching resistance, the user can again depress the "Selector" button 34 to instruct the electrical circuit 27 to continue monitoring and displaying the change in positive angular rotation away from the zeroed out position toward the desired angle.

In contemplated embodiments, the digital angle meter 14 may automatically detect when the ratchet has been moved in the positive direction until resistance has been reached. Specifically, the user may place the head 16 of the wrench 12 of the wrenching device 10 onto a nut or bolt to be tightened, and the user may next depress and hold the "Selector" button 34 for a number of seconds until the display 32 indicates that the digital angle meter 14 is powered on, as described above. A desired total angle (i.e., a total angle) may be input into the digital angle meter 14 in the manner previously described. A reference angle position—i.e., an initial position from which the total rotational angle is calculated—may be stored in the memory 54 when the "Selector" button 34 is pressed.

The user may then begin to rotate the wrenching device 10 around a longitudinal axis (e.g., the central axis CA) of the head 16 in a first direction (i.e., a positive direction), such as a direction in which the nut or bolt is tightened (e.g., a clockwise direction). The digital angle meter 14 may detect a first rotation of the wrenching device 10 about the central axis CA in the first direction from the reference angle position to a first angle position, and a first angle between the reference angle position and the first angle may be stored on the memory 54 of the digital angle meter 14. The first rotation (and any subsequent rotation) may be detected by any suitable sensor electrically connected to the processor 52 of the digital angle meter 14. For example, the first rotation may be detected by the gyrometer 56. Alternatively, the first rotation may be detected by an accelerometer (not shown). The first angle may be indicated on the display 32. If the desired total angle is achieved during the first rotation, an alarm may be activated, such as an audible beep and/or a visual light.

If the desired total angle has not been reached, the user may rotate the wrenching device 10 around the central axis CA in a second direction opposite to the first direction (e.g., a counterclockwise direction) to ratchet the wrench 12. The digital angle meter 14 may detect this second rotation of the wrenching device 10 about the central axis CA in the second direction from the first angle position to a second angle position. A second angle is formed between the first angle position and the second angle position, and the second angle may be stored on the memory 54 of the digital angle meter 14. The second angle may be indicated on the display 32.

The user may again rotate the wrenching device 10 around the central axis CA in the first direction, and the digital angle meter 14 may detect a third rotation of the wrenching device 10 about the central axis CA from the second angle position to a third angle position until engaging a first resistance position, which will be described in more detail below. A third angle is formed between the second angle position and the third angle position, and the third angle may be stored on the memory 54 of the digital angle meter 14. The third angle may be indicated on the display 32.

With reference to the first resistance position, when transitioning a ratcheting wrench from a counterclockwise ratcheting rotation to a positive, clockwise rotation in which the bolt or nut is rotated into engagement with a threaded surface, a positive rotation of the nut or bolt may not be instantaneous. That is, "slop" (also known as "play") between the head 16 of the wrench 12 and the head of the nut or bolt may prevent a positive rotation of the wrench 12 from immediately resulting in a corresponding rotation of the nut or bolt in a positive direction following a negative ratcheting action of the wrench 12. This "slop" may be caused by dimensional differences between the interior surfaces of the head 16 and the surfaces forming the head of the nut or bolt. Dimensional differences in the parts that form the internal ratcheting mechanism may also cause or contribute to "slop."

Figure 12:
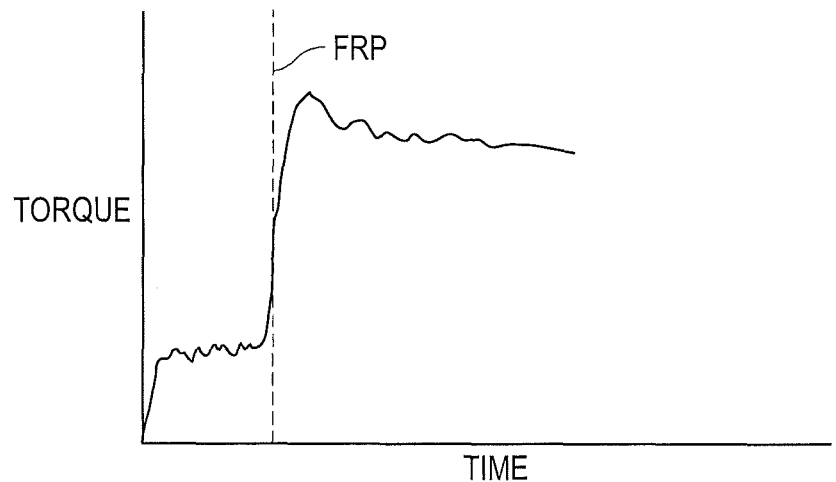
FIG. 12 is a torque vs. time graph of a wrenching device that is positively rotating a nut or bolt following a ratcheting action.

The rotational angle corresponding to "slop" ends when resistance is met (i.e., at a first resistance position) indicating that the nut or bolt is engaged by the head 16 and is beginning to (or ready to) be rotated into engagement with a corresponding threaded surface (i.e., the bolt or nut is tightened). This first resistance position may be identified in any suitable manner. For example, the first resistance position may be indicated by an appreciable increase in torque required to continue to turn the wrench 12 in the positive direction past the first resistance position. A typical torque vs. time graph (assuming a uniform or substantially uniform rate of rotation of the wrench 12) is provided in FIG. 12. In such a graph, during the rotational period corresponding to "slop" (e.g., see the portion of the graph from the t=0 to t=FRP), the torque required to turn the wrench 12 may be relatively low. However, when the first resistance position FRP is reached, the torque required to continue to rotate the wrench in the positive direction may increase—and may increase substantially (e.g., see the portion of the graph to the right of t=FRP). For example, the torque required to turn the wrench 12 past the first resistance position FRP may be (equal to or) greater than 10% greater than the maximum (or average) torque required to rotate the wrench 12 up to the first resistance position FRP (i.e., during the period of "slop"). More specifically, the torque required to turn the wrench 12 past the first resistance position FRP may be between 10% and 1000% greater than the maximum (or average) torque required to rotate the wrench 12 up to the first resistance position FRP. However, the torque required to turn the wrench 12 past the first resistance position FRP may be less than 10% and/or more than 1000% greater than the maximum (or average) torque required to rotate the wrench 12 up to the first resistance position FRP.

Another method to determine the first resistance position FRP may be identifying when the torque increases or begins to increase to a maximum over a predetermined rotational angle (such as 5 or 10 degrees) or during a predetermined time range (such as 2 to 5 seconds) of rotation in the positive direction following ratcheting. The first resistance position FRP will occur at or adjacent to the point of maximum torque (or at a point at which the torque begins to increase to the point of maximum torque) over the predetermined time or rotational range. The predetermined time or rotational range should be calculated to be greater than the time or rotational angle in which "slop" could or would be experienced.

Figure 13:
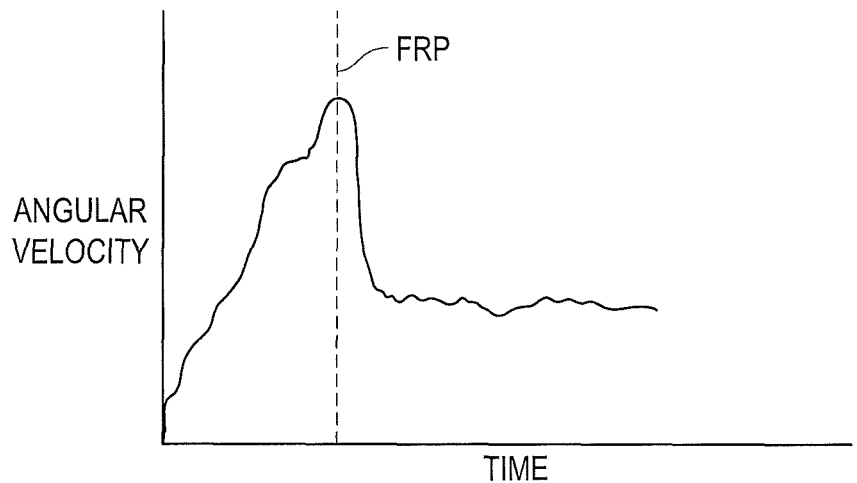
FIG. 13 is an angular velocity vs. time graph of a wrenching device that is positively rotating a nut or bolt following a ratcheting action.

Alternatively (or additionally), the first resistance position may be indicated by an appreciable decrease in angular velocity of the wrench 12 as the wrench is rotated past the first resistance position FRP about the central axis CA. A typical angular velocity vs. time graph is provided in FIG. 13. In such a graph, during the rotational period corresponding to "slop," the angular velocity of the rotating wrench 12 may be relatively high or may increase relatively abruptly (e.g., see the portion of the graph from the t=0 to t=FRP). However, when the first resistance position FRP is reached, the angular velocity of the wrench in the positive direction may decrease—and may decrease substantially and rapidly (e.g., see the portion of the graph to the right of t=FRP). For example, the angular velocity of the wrench 12 as it turns past the first resistance position FRP may be 90% to 10% of the value of the maximum (or average) angular velocity of the wrench 12 up to the first resistance position FRP (i.e., during the period of "slop").

Another method to determine the first resistance position FRP may be identifying when the difference between angular velocity readings decreases dramatically over a relatively short time period. For example, a maximum angular velocity may be detected over a predetermined rotational angle (such as 5 or 10 degrees) or during a predetermined time range (such as 2 to 5 seconds) of rotation in the positive direction following ratcheting. The first resistance position FRP will occur at or adjacent to the point of where the maximum angular velocity occurs over the predetermined time or rotational range. If the angular velocity readings are inconsistent over the predetermined time or rotational range, the maximum angular velocity (which may be updated and saved on the memory 54) may be compared with subsequent angular velocity values to detect the largest drop in value. For example, the largest drop in value may be detected over a predetermined rotational angle (such as 5 or 10 degrees) or during a predetermined time range (such as 2 to 5 seconds) of rotation in the positive direction following ratcheting. The first resistance position FRP will occur at or adjacent to the point of maximum angular velocity associated with the largest value drop in angular velocity (e.g., a point in which the slope of the instantaneous angular velocity curve is zero) over the predetermined time or rotational range. The predetermined time or rotational range should be calculated to be greater than the time or rotational angle in which "slop" could or would be experienced.

The first resistance position FRP may be detected in any manner known in the art. For example, a user may identify when the first resistance position FRP is engaged by detecting an appreciable increase in torque when manually turning the wrenching device 10. Additionally, the first resistance position FRP may be detected by any suitable sensor known in the art. For example, the first resistance position FRP may be detected by the gyrometer 56 and/or by an accelerometer (not shown) that each detects one of or both of the angular velocity or the torque associated with rotating the wrenching device about the central axis CA. An alarm (e.g., the alarm 60) electrically connected to the processor 52 may activate to indicate that the first resistance position FRP has been engaged. The alarm may be any suitable indication to the user that the first resistance position FRP has been engaged and that the user may continue to tighten the nut or bolt. For example, the alarm may be a visible alarm (e.g., the activation of one or more LEDs) and/or may be an audio alarm (e.g., a double beep).

After the first resistance position FRP is detected, the user may continue to rotate the wrenching device 10 around the central axis CA in the first direction past the first resistance position FRP, and the digital angle meter 14 may detect a fourth rotation of the wrenching device 10 about the central axis CA from the third angle position to a fourth angle position. A fourth angle between the third angle position and the fourth angle position is stored on the memory 54 of the digital angle meter 14. The fourth angle may be indicated on the display 32.

In contemplated embodiments, the user may positively rotate the wrenching device 10 around the central axis CA from the second angle position to the third angle position (i.e., the third rotation) until the user detects that the first resistance position has been engaged. The user may detect the first resistance position in any suitable manner, such as by detecting an appreciable increase in torque when manually turning the wrenching device 10 in the positive direction about the central axis CA as previously described. Immediately after (or as) the user detects that the first resistance position FRP is or has been engaged, the user may pause (i.e., cease rotating the wrenching device 10) for a predetermined time. The digital angle meter 14 detects the pause and determines that the first resistance position is engaged. Following the pause, the user may resume turning the wrenching device 10 around the central axis CA in the positive direction from the third angle position (i.e., the fourth rotation) as previously described. The pause may be any predetermined length of time suitable to communicate to the digital angle meter 14 that the first resistance position FRP has been identified and that the digital angle meter 14 should begin to detect the fourth rotation. The pause may be from one to five seconds and may be, for example, two seconds. Following the pause, the digital angle meter 14 may confirm that it is transitioning or has transitioned from the third rotation to the fourth rotation. For example, the digital angle meter 14 may activate an alarm (e.g., the alarm 60) electrically connected to the processor 52 to indicate that the digital angle meter 14 recognizes that the first resistance position FRP has been engaged. The alarm may be any suitable indication to the user that the first resistance position FRP has been engaged and that the user may continue to tighten the nut or bolt. For example, the alarm may be a visible alarm (e.g., the activation of one or more LEDs), a tactile alarm (e.g., vibratory) and/or may be an audio alarm (e.g., a double beep). Activation of the alarm indicates to the user that the user may resume turning the wrenching device 10 around the central axis CA in the positive direction as previously described.

At the conclusion of the fourth rotation—that is, when the digital angle meter 14 detects that the wrenching device 10 has completed the rotation around the central axis CA from the third angle position to the fourth angle position and has ceased rotating, the digital angle meter 14 may calculate a first aggregate angle of rotation of the nut or bolt by adding the first angle to the fourth angle, and the total angle of rotation is the first aggregate angle of rotation. The total angle of rotation may be indicated on the display 32. If the total angle of rotation is equal to the desired total rotation initially indicated by the user, an alarm may be activated, such as a beep.

One skilled in the art would recognize that the second rotation (i.e., the rotation of the wrenching device 10 about the central axis CA in the second direction from the first angle position to the second angle position) and the third rotation (i.e., the rotation of the wrenching device 10 about the central axis CA from the second angle position to the third angle position until engaging a first resistance position) are not factored into the first aggregate angle of rotation of the nut or bolt, and the second rotation and the third rotation may therefore have any value. As such, the second rotation and the third rotation may be automatically ignored by the digital angle meter 14 when calculating a first aggregate angle of rotation.

In some instances, no first resistance position FRP can be detected. That is, there may be no "slop" when transitioning the wrench 12 from a counterclockwise ratcheting rotation to a positive, clockwise rotation in which the bolt or nut is rotated into engagement with a threaded surface. More specifically, there may be no appreciable increase in torque or decrease in angular velocity detected by the sensor (or by the user) over the third rotation of the wrenching device 10. When no first resistance position FRP can be detected, the rotation of the wrenching device 10 continues in the first direction, and the digital angle meter 14 may calculate a first aggregate angle of rotation by adding the first angle to the third angle, and the total angle of rotation is the first aggregate angle of rotation. If this total angle of rotation is equal to the desired total rotation initially indicated by the user, an alarm may be activated, such as a beep.

If the total angle of rotation is less than the desired total rotation initially indicated by the user, the user may again ratchet the wrenching device 10 by rotating it about the central axis CA in the second direction from the fourth angle position to a fifth angle position, and a fifth angle is formed between the fourth angle position and the fifth angle position. The fifth angle position may be stored on the memory 54 of the digital angle meter 14, and the fifth angle may be indicated on the display 32.

The user may then rotate the wrenching device 10 about the central axis CA in the first direction from the fifth angle position to a sixth angle position until engaging a second resistance position. The second resistance position may be identified in the same manner as the first resistance position. A sixth angle is formed between the fifth angle position and the sixth angle position. The sixth angle position is stored on the memory 54 of the digital angle meter 14, and the sixth angle may be indicated on the display 32. As was the case with the first resistance position FRP, the second resistance position may not be detected, and the digital angle meter 14 may then calculate a second aggregate angle of rotation by adding the first aggregate angle of rotation to the sixth angle, and the total angle of rotation is the second aggregate angle of rotation.

If the second resistance position is detected, the user may continue to rotate the wrenching device 10 around the central axis CA in the first direction past the second resistance position, and the digital angle meter 14 may detect a seventh rotation of the wrenching device 10 about the central axis CA from the sixth angle position to a seventh angle position. A seventh angle between the sixth angle position to the seventh angle position is stored on the memory 54 of the digital angle meter 14, and the seventh angle may be indicated on the display 32.

The digital angle meter 14 may then calculate a second aggregate angle of rotation by adding the first aggregate angle of rotation to the seventh angle, and the total angle of rotation is the second aggregate angle of rotation. If the total angle of rotation is equal to the desired total rotation initially indicated by the user, an alarm may be activated, such as a beep. If the total angle of rotation is less than the desired total rotation initially indicated by the user, the user may repeat the process above until the total desired angle is reached.

Figure 14:
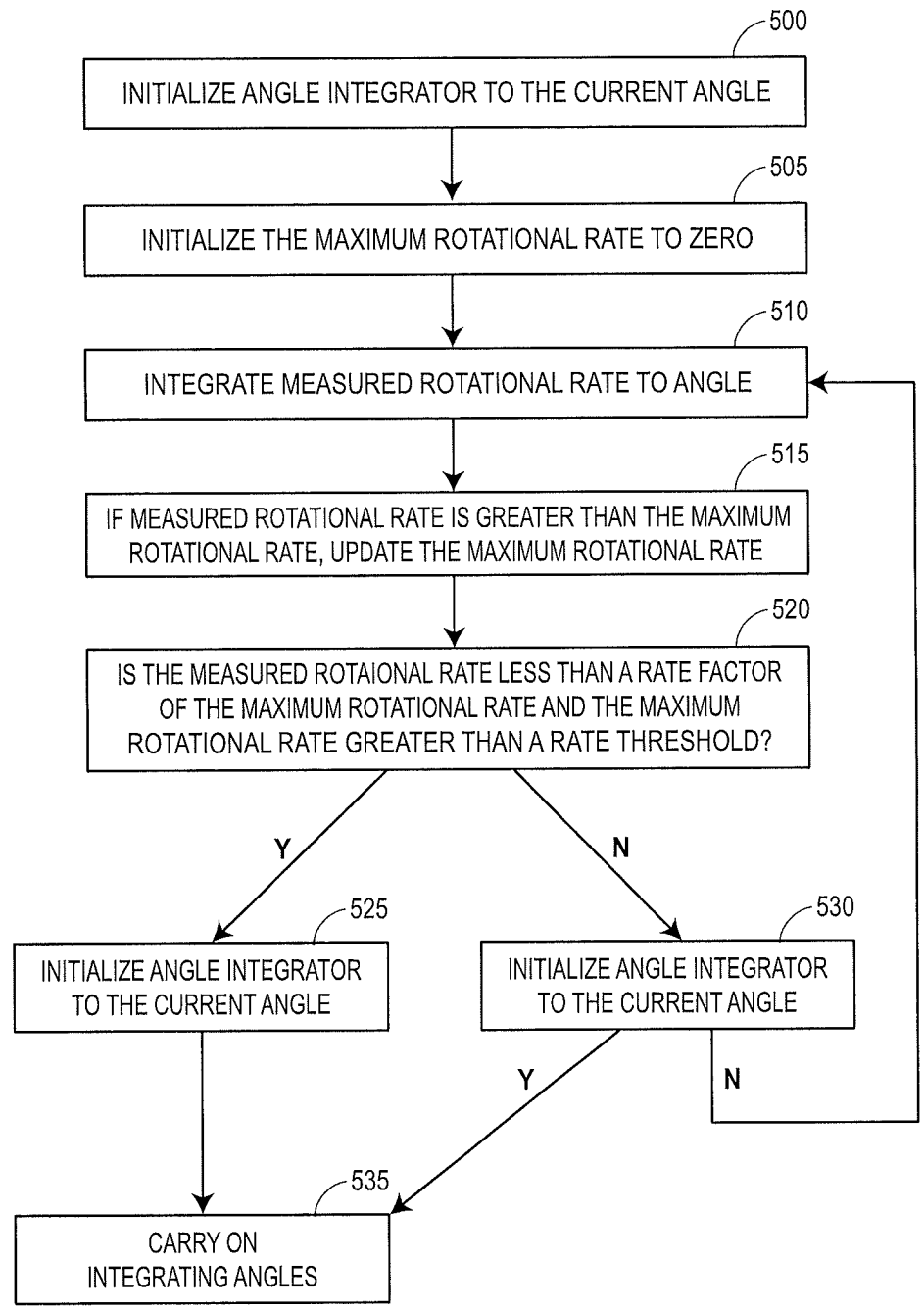
FIG. 14 is a flowchart representative of a method of using the digital angle meter to calculate a total rotational angle of a nut or bolt by a ratcheting wrench device.

An example of determining the total angle of rotation—including a the determination of the first resistance position FRP, if present—using the angular velocity of the wrenching device 12 is illustrated in FIG. 14. The angle integrator (i.e., the angle measuring apparatus, such as the gyrometer 56) is first initialized to a current angle, as indicated in block 500. The maximum rotational rate is then initialized to zero, as indicated in block 505. As the wrenching device 10 is rotated in the positive direction, the measured rotational rate is converted to an angle, as indicated in block 510. Each incremental angle is stored in the memory 54, and the corresponding measured rotational rate is compared to the maximum rotational rate, as indicated in block 515. If necessary, the maximum rotational rate is updated and stored to the memory 54. If a measured rotational rate is less than a rate factor of the maximum rotational rate (where the rate factor is a predetermined fraction, such as ½, and is stored on the memory 54), and the maximum rotational rate is greater than a rate threshold (where the rate threshold is a predetermined rate—such as 3000 to 4000 counts from the gyrometer 56—stored on the memory 54), the angle integrator is initialized to the current value (i.e., integrated angles are disregarded), as indicated in block 525. Angles are then integrated, as indicated in block 535.

If the measured rotational rate is not less than a rate factor of the maximum rotational rate or the maximum rotational rate is not greater than a rate threshold, and the angle has moved through more than an angle threshold (where the angle threshold is a predetermined value, such as 5 or 10 degrees, and is stored on the memory 54), as indicated in block 530, the angles continue to integrated as indicated in block 535. However, if the measured rotational rate is not less than a rate factor of the maximum rotational rate and the maximum rotational rate is not greater than a rate threshold, and the angle has not moved through more than the angle threshold, as indicated in block 530, proceed to block 510 where the measured rotational rate is converted to an angle.

Figure 15:
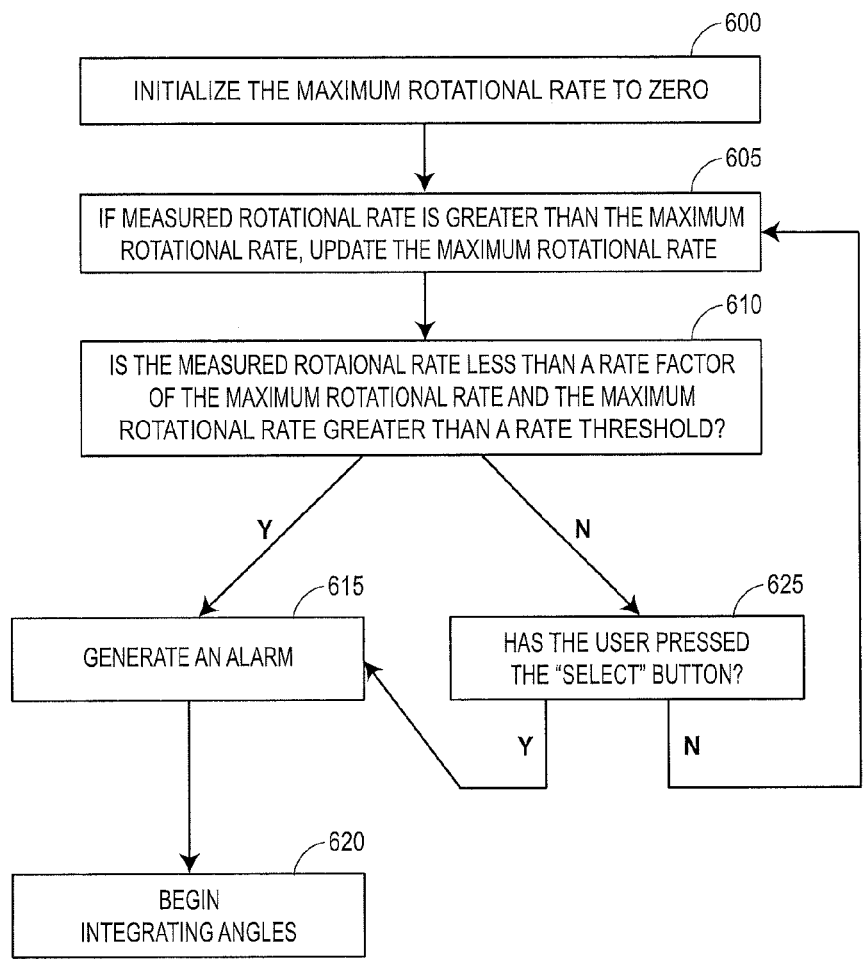
FIG. 15 is a flowchart representative of a method of using the digital angle meter to calculate a total rotational angle of a nut or bolt by a ratcheting wrench device.

A further example of determining the total angle of rotation of the wrenching device 10—including the determination of the first resistance position FRP, if present—is illustrated in FIG. 15. The maximum rotational rate is first initialized to zero, as indicated in block 600. As the wrenching device 10 is rotated in the positive direction, the measured rotational rate is compared to the maximum rotational rate, as indicated in block 605. If necessary, the maximum rotational rate is updated and stored to the memory 54. If a measured rotational rate is less than a rate factor of the maximum rotational rate, and the maximum rotational rate is greater than a rate threshold (indicated in block 610), then an alarm is generated, as indicated in block 615. Angles may then begin to be integrated, as provided in block 620.

If the measured rotational rate is not less than a rate factor of the maximum rotational rate or the maximum rotational rate is not greater than a rate threshold, and the user has pressed the "Select" button 34, as illustrated in block 625, then an alarm is generated, as indicated in block 615. Angles may then begin to be integrated, as provided in block 620. If the measured rotational rate is not less than a rate factor of the maximum rotational rate or the maximum rotational rate is not greater than a rate threshold, and the user has not pressed the "Select" button 34, as indicated in block 625, then the measured rotational rate is compared to the maximum rotational rate, as indicated in block 605.

Upon reaching the desired angle, the alarm 60 on the digital angle meter 14 can emit an alarm signal in the form of a beep, a buzz, a light, a vibration, etc., as indicated by block 114. In one form, the angle meter 14 can have, for example, three LED lights as a part of the alarm 60. For example, when the digital display 32 reads 90% of the target angle, a yellow LED light can be illuminated; when the digital display 32 reads 100% of the target angle, a green LED light can be illuminated; and, when the digital display reads 110% of the target angle, a red LED light can be illuminated. Alternatively, or additionally, the alarm, 60 could include an audible alarm that, for example, begins beeping when the digital display reaches 90% and steadily increases in frequency until the digital display reads 100%, at which point, the angle meter 14 emits a constant beep. The foregoing alarm scenarios are mere examples and other alarm sequences are intended to be included within the scope of the present disclosure. Once the target angle is reached, the torque wrench application of the device 12 depicted in FIG. 1 is complete.

As mentioned, the digital angle meter 14 measures and displays the angle of the wrench 12 as it rotates around the central axis CA of the head 16. This measurement is obtained through the use of the at least one gyrometer 56, in a known manner, in combination with the logic stored on the memory 54 and executed by the processor 52.

Figure 6:
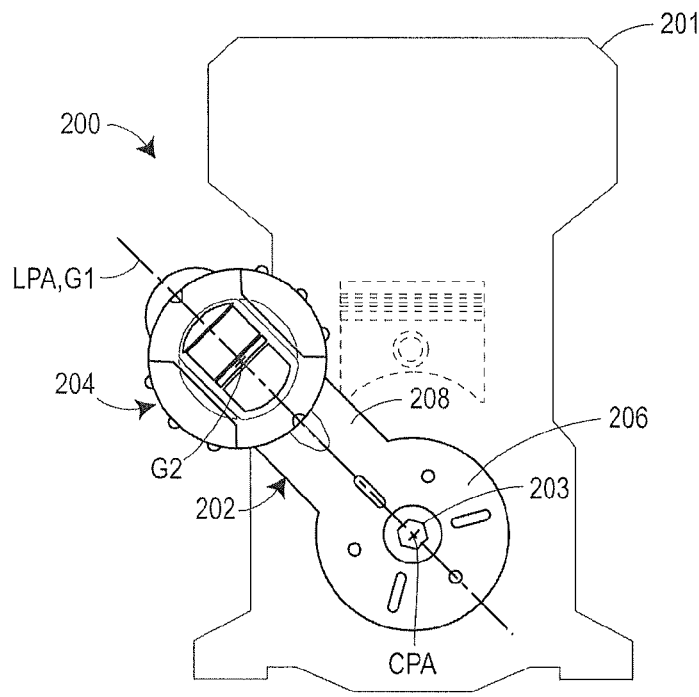
FIG. 6 is a plan view of a crankshaft degree tooling system constructed in accordance with the present disclosure.
Figure 7:
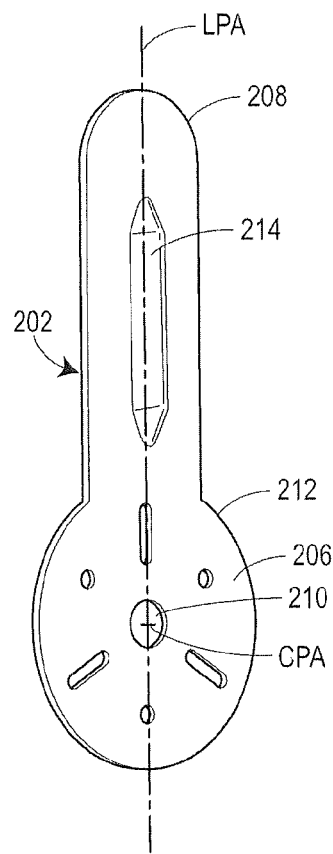
FIG. 7 is a plan view of a crankshaft bracket of the system of FIG. 6.

While the digital angle meter 14 has thus far been described as being used with the wrench 12 disclosed in reference to FIG. 1, other applications and uses are intended to be included within the present disclosure. For example, FIG. 6 depicts a crankshaft degree tooling system 200 constructed in accordance with the present disclosure for determining, for example, piston top dead center, cam centerline, and/or cam duration of an internal combustion engine 201. The system 200 of FIG. 6 includes a crankshaft bracket 202 and a digital angle meter 204. The digital angle meter 204 can be identical to the digital angle meter 14 disclosed above with reference to FIGS. 1-5. The crankshaft bracket 202 includes a single piece of metallic material stamped or otherwise formed into the configuration illustrated in FIGS. 6 and 7. That is, the crankshaft bracket 202 includes a head plate portion 206 and a stem plate portion 208. The head plate portion 206 is circular and defines an aperture 210 in the center thereof for engaging a crankshaft 203 of the internal combustion engine 201, as illustrated in FIG. 6, for example. So configured, the head plate portion 206 includes a central plate axis CPA around which the crankshaft bracket 202 rotates during use. The central plate axis CPA corresponds directly to a central axis of the crankshaft of the engine itself. The stem plate portion 208 extends radially outward from a perimeter 212 of the head plate portion 206 and along a longitudinal plate axis LPA that is transverse and, more particularly, perpendicular to the central plate axis CPA. As illustrated in FIG. 7, the crankshaft bracket 202 also includes an elongated protrusion 214 extending outward away from a face 216 of the stem plate portion 208. The elongated protrusion 214 is adapted to be removably received in the elongated groove 40 of the digital angle meter 204 to restrict rotation of the digital angle meter 204 relative to the crankshaft bracket 202 when removably attached thereto by the attachment mechanism 42 (e.g., the magnets 44a, 44b). That is, the magnets 44a, 44b depicted in FIG. 3 are sufficiently strong to attract to the elongated protrusion 214 on the stem plate portion 208 of the crankshaft bracket 202 and hold the digital angle meter 204 in position. So attached, the first gyrometer axis G1 shown in FIGS. 2 and 6 of the digital angle meter 204 extends parallel to the longitudinal plate axis LPA of the crankshaft bracket 202. Additionally, in versions where the at least one gyrometer 56 includes a second gyrometer axis G2, the second gyrometer axis G2 extends perpendicular to the first gyrometer axis G1. However, because the stem plate portion 208 of the crankshaft bracket 202 is flat, there is no tendency for the digital angle meter 204 to roll or pitch about the longitudinal plate axis LPA and, as such, the second gyrometer axis G2 is likely to remain parallel with the central plate axis CPA at all times.

With the system 200 arranged and configured as described with reference to FIGS. 6 and 7, the digital angle meter 204 can be utilized to determine piston top dead center, cam centerline, and/or cam duration. For example, with reference to the flowchart depicted in FIG. 8, a user can first depress the "Selector" button 34 of the digital angle meter 204 for a few seconds to turn on the device, as indicated at block 300. If the display 32 reads "TDC," the user again depresses the "Selector" button 34 to start the top dead center measurement process, as indicated at block 302. As indicated at block 304, the user, using a conventional wrench, rotates the engine clockwise until the piston contacts a stop mechanism previously installed onto the engine in a known manner, and depresses the "Selector" button 34, as indicated at block 304. The digital angle meter 204 stores a first angle α1 in the memory 54, which is representative of the position of the crankshaft bracket 202 in this first stop position. Throughout the rotation of the engine in the clockwise direction, the digital angle meter 204 continuously displays the rotational angle of the crankshaft bracket 202 relative to the starting position of the crankshaft bracket 202. Then, as indicated at block 306, the user rotates the engine in the counterclockwise direction until the piston again contacts the stop mechanism, and presses the "Selector" button 34. The digital angle meter 204 stores a second angle α2 in the memory 54, which is representative of the position of the crankshaft bracket 202 in this second stop position. Instead of pressing the "Selector" button 34 to initiate the storage of the first and second angles α1, α2 at blocks 304 and 206, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles α1, α2.

The processor 52 of the digital angle meter 204 then automatically calculates and displays the top dead center based on the first and second stored angles α1, α2, as indicated at block 308. The top dead center (TDC) is calculated by summing the first and second angles α1, α2, subtracting that sum from 360 degrees, and dividing the difference by two. The equation is as follows: TDC=[360−(α1+α2)]/2.

Figure 8:
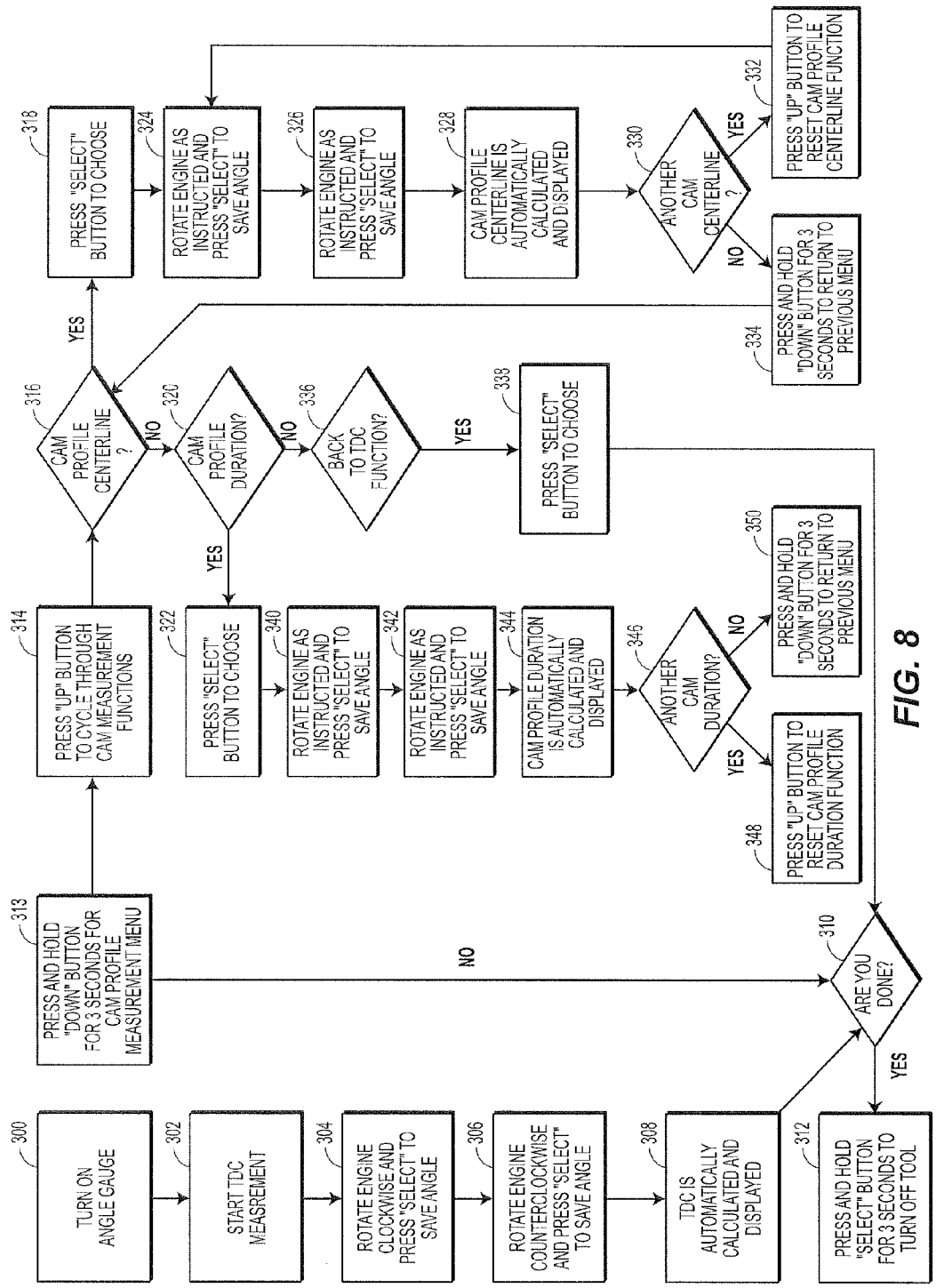
FIG. 8 is a flowchart representative of a method of using the crankshaft degree tooling system of FIG. 6.

At this point, if the user is done, the user may depress the "Selector" button 34 for a few seconds to turn off the digital angle meter 204, as indicated by blocks 310, 312 in FIG. 8. If, however, the user would like to continue on and measure the cam centerline and/or the cam duration of the engine, the user can depress the "Down" button 36, for example, for a few seconds until the display 32 displays a cam measurement menu, as indicated at block 313. The user can then depress the "Up" button 38 to cycle through the cam measurement options, i.e., cam profile centerline (CPC) and cam profile duration (CPD), as indicated at block 314. If the user wants to measure the cam profile centerline, the user depresses the "Selector" button 34 when the display 32 reads "CPC," as indicated by blocks 316 and 318. If, however, the user instead wants to measure the cam duration, the user depresses the "Selector" button 34 when the display reads "CPD," as indicated at blocks 320 and 322.

When the CPC measurement is selected, the user rotates the engine until a dial caliper fixed to the engine in a known manner reads 0.050" and depresses the "Selector" button 34 to save a first angle β1 associated with the first 0.050" caliper position, as indicated at block 324 of FIG. 8. Then, the user then continues to rotates the engine until the dial caliper peaks and then drops back to 0.050" and depresses the "Selector" button 34 to save a second angle β2 associated with the second 0.050" caliper position, as indicated at block 326. Similar to that mentioned above with respect to calculating TDC, instead of pressing the "Selector" button 34 to initiate the storage of the first and second angles β1, β2 at blocks 324 and 326, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles β1, β2. The processor 52 of the digital angle meter 204 then automatically calculates and displays the cam profile centerline (CPC) based on the first and second angles β1, β2, as indicated at block 328. The cam centerline is calculated by adding the first and second angles β1, β2 together and dividing the sum by two. That is, the equation is as follows: CPC=[β1+β2]/2.

If the user is interested in performing another CPC measurement, the user can depress the "Up" button 38 on the digital angle meter 204 to return to block 324 of FIG. 8, as indicated by blocks 330 and 332. Otherwise, the user can depress the "Down" button 36 for a few seconds to return to block 316, as indicated at block 334. At block 316, the user has another option to pursue another cam centerline measurement, or a cam profile duration measurement.

For the sake of description, if the user wishes to quit, the digital angle meter 204 scrolls back through the options, as indicated by blocks 320, 336, and 338. Thus, the user has the option to pursue another TDC measurement if desired, as indicated at block 336, for example.

If the user wishes to pursue a cam profile duration (CPD) measurement, the user presses the "Selector" button 34, as indicated at blocks 320, 322. Then, as indicated at block 340, the user rotates the crankshaft of the engine until a dial caliper fixed to the engine in a known manner gives some reading and depresses the "Selector" button 34 to store a first angle γ1 associated with this first position. Identifying the first position may require the user to move the crankshaft back and forth in small increments to identify the precise location of the first reading taken by the dial caliper. Then, as indicated by block 342, the user continues to rotate the crankshaft of the engine until the dial caliper peaks and drops back down to a reading of zero lift and depresses the "Selector" button 34 to store a second angle γ2 associated with this second position. Again, identifying this second position may require the user to move the crankshaft back and forth to precisely identify when the dial caliper returns to zero. Similar to that mentioned above with respect to calculating TDC and CPC, instead of pressing the "Selector" button 34 to initiate the storage of the first and second angles γ1, γ2 at blocks 340 and 342, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles γ1, γ2.

With the first and second angles γ1, γ2 determined and stored in the memory 54, the processor 52 of the angle meter 204 automatically calculates and displays the cam profile duration (CPD), as indicated at block 344. The cam profile duration (CPD) is calculated by subtracting the first angle γ1 from the second angle γ2. That is, the equation is as follows: CPD=γ2−γ1.

Once the cam profile duration is calculated and displayed, the digital angle meter 204 enables the user to decide to pursue another CPD measurement, as indicated by blocks 346 and 348, or return to previous menus, as indicated at blocks 346 and 350. Pursuing another CPD measurement returns the process to block 340, as illustrated, while returning to previous menus returns the process to block 320. When the user is ultimately done using the system 200, the "Selector" button 34 can be depressed and held for a few seconds to turn the power off. Upon restarting the system 200, the previous measurements will remain stored in the memory until new measurements are taken.

Thus, from the foregoing, it should be appreciated that the devices and systems disclosed herein provide for accurate, repeatable, and predictable measurement techniques for torque wrenches, as well as crankshaft degree measuring tools.

While the system 200 of FIGS. 6 and 7 has been described as utilizing a specific crankshaft bracket 202, it should be appreciated that other items could be used to serve the purpose of the bracket 202. For example, a user could fashion a bracket out of a piece of sheet metal that may or may not include a protrusion similar to the elongated protrusion 214.

Figure 9:
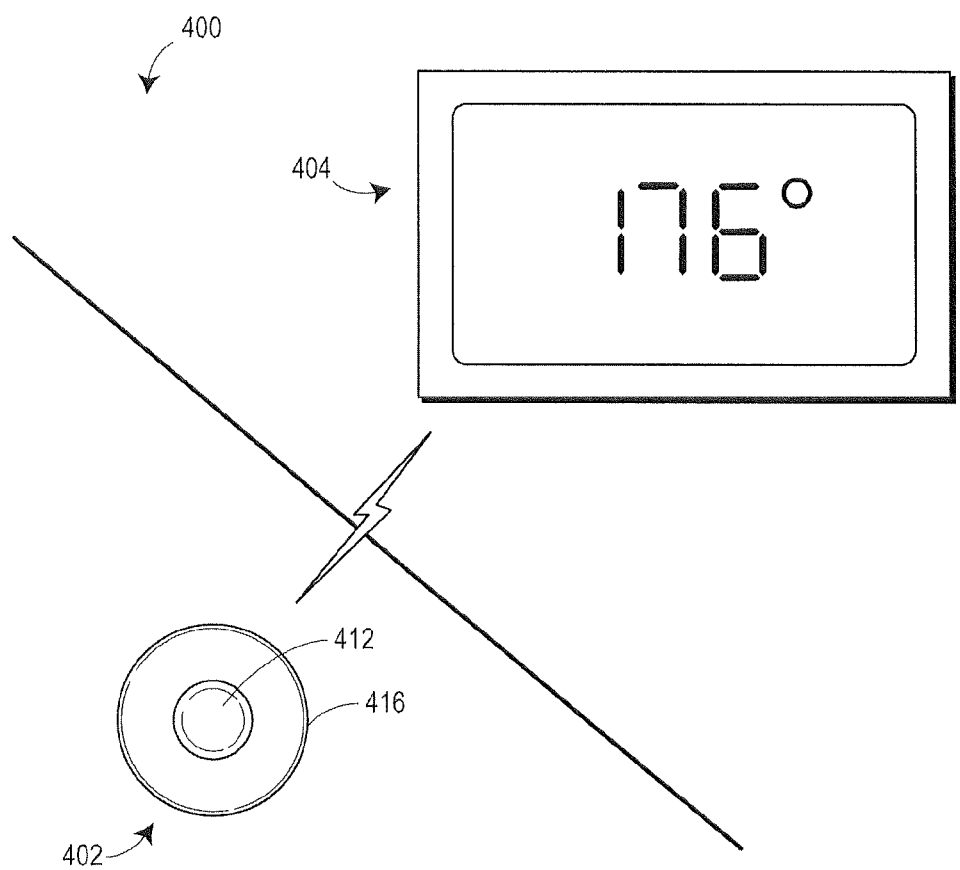
FIG. 9 is a perspective view of a digital angle meter system constructed in accordance with the present disclosure.
Figure 10:
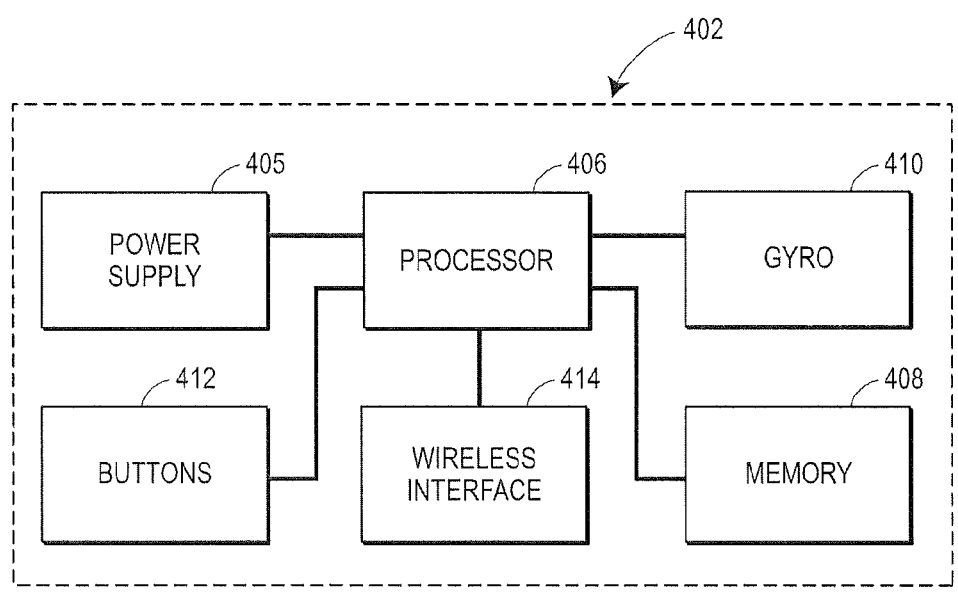
FIG. 10 is a block diagram of an electrical circuit of a sensor component of the digital angle meter of FIG. 9.
Figure 11:
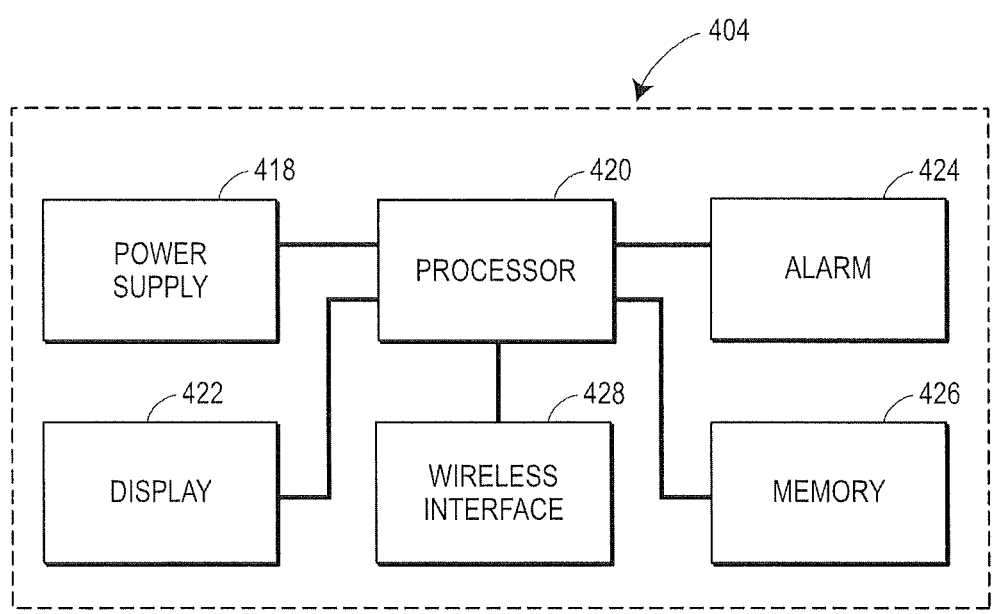
FIG. 11 is a block diagram of an electrical circuit of a display component of the digital angle meter of FIG. 9.

While the various devices and systems described thus far have included digital angle meters 14, 204 equipped with display and alarm components carried on-board the same component that performs the measuring, calculating, etc., in an alternative version, the digital angle meter 14, 204 can be divided up into two components, as depicted in FIGS. 9-11, for example. FIG. 9 depicts a digital angle meter system 400 that includes separate sensor and display components 402, 404 that are in wireless communication with each other. As shown in FIG. 10, the sensor component 402 includes an electrical circuit that includes a power supply 405, a processor 406, a memory 408, at least one gyrometer 410, one or more buttons 412, and a wireless interface 414. Each of these components are carried within a sensor housing 416, which can be designed and constructed similar to the housing 24 of the digital angle meter 12 described with reference to FIGS. 1-8. That is, the sensor housing 416 of the system 400 can include an elongated groove, similar to groove 40 described above, for facilitating attachment and alignment onto a stem of a wrench or a crankshaft bracket, for example. In contrast, however, because the sensor component 402 lacks a display, the external dimensions may be smaller than the external dimensions of the digital angle meters 14, 204 described above. The sensor component 402 works identical to the digital angle meters 14, 204 described above, except that it does not perform any displaying function. Rather, the processor 406 of the sensor component 402 generates a signal indicative of the various measurements and calculations that it performs and sends that signal out via the wireless interface 414.

The display component 404 is therefore equipped to receive signals from the sensor component 402 and display the desired information. Accordingly, the display component 404, as depicted in FIG. 11, includes a power supply 418, a processor 420, a display 422, an alarm 424, a memory 426, and a wireless interface 428. So configured, the wireless interface 428 of the display component 404 is configured to receive signals transmitted from the wireless interface 414 of the sensor component 402. The processor 420 of the display component 404 then processes those signals and instructs the display 422 to display angles and the results of computations in accordance with any of the processes described above with reference to FIGS. 1-8. Additionally, as the display component 404 is also equipped with the alarm 424, the processor 420 communicates with the alarm 420 to activate the same at the appropriate time as discussed above.

While FIG. 9 illustrates the one or more buttons 412 of the sensor device 402 as including a single button, it should be appreciated that the sensor component 402 could be equipped with each of the "Selector," "Up," and "Down" buttons, as described above with reference to the digital angle meters 12, 204 in FIGS. 1-8. Alternatively, the one or more buttons 412 may not be part of the sensor component 402 at all, but rather, part of the display component 404. In other forms, the sensor component 402 and the display component 404 could be equipped with buttons for functioning the system 200, or the system could include a separate remote control including the buttons 34, 36, 38, for example, for controlling the system.

The system 400 disclosed with references 9-11 advantageously enables a user to position the display component 404 at a location remote from the sensor component 402. This could be beneficial in working environments where the user may not be able to gain a direct line of sight to the display 32 on the digital angle meters 12, 204 described above. With the system 400, the user could, for example, mount the display component on a work bench, wall, or other location, where the display 422 could be easily viewed by the user and other workers. Furthermore, my separating the display 422 and alarm 424 from the sensor component 402, the size of the sensor component 402 can be reduced, which may enable the system 400 to be used in situations where the larger angle meters 14, 204 are too large and cumbersome.

In view of the foregoing, it should be appreciated that the present disclosure is not intended to be limited to the specific examples disclosed, but rather, also includes any foreseeable alternative constructs that a person having ordinary skill in the art would understand to be logically included.

What is claimed:

1. A method of calculating a total angle of rotation of a wrenching device used to apply a torque to a fastening device rotating about a longitudinal axis, the wrenching device including a digital angle meter including a gyrometer, a processor, a memory, and logic stored on the memory, the method comprising:

detecting a first rotation of the wrenching device about the longitudinal axis in a first direction from a reference angle position to a first angle position, wherein a first angle between the reference angle position and the first angle position is stored on the memory of the digital angle meter, and wherein the first rotation is detected by the gyrometer of the digital angle meter;

detecting a second rotation of the wrenching device about the longitudinal axis in a second direction opposite to the first direction from the first angle position to a second angle position, wherein a second angle is formed between the first angle position and the second angle position, and wherein the second rotation is detected by the gyrometer of the digital angle meter;

detecting a third rotation of the wrenching device about the longitudinal axis in the first direction from the second angle position to a third angle position until engaging a first resistance position, wherein a third angle is formed between the second angle position and the third angle position, and wherein the third rotation is detected by the gyrometer of the digital angle meter;

detecting a fourth rotation of the wrenching device about the longitudinal axis in the first direction from the third angle position to a fourth angle position, wherein a fourth angle between the third angle position and the fourth angle position is stored on the memory of the digital angle meter, and wherein the fourth rotation is detected by the gyrometer of the digital angle meter; and calculating a first aggregate angle of rotation by adding the first angle to the fourth angle, wherein the total angle of rotation is the first aggregate angle of rotation, and wherein the first aggregate angle of rotation is calculated by the processor of the digital angle meter.

2. The method of claim 1, further comprising:
ignoring the second rotation of the wrenching device and the third rotation of the wrenching device by the processor of the digital angle meter.

3. The method of claim 1, further comprising:
automatically ignoring the second rotation of the wrenching device and the third rotation of the wrenching device by the processor of the digital angle meter.

4. The method of claim 1, wherein engaging the first resistance position includes detecting a decrease in angular velocity of the wrenching device in the first direction, wherein the decrease in angular velocity of the wrenching device is detected by a sensor in communication with the processor.

5. The method of claim 4, wherein the sensor is one of the gyrometer and an accelerometer.

6. The method of claim 5, wherein an alarm is generated when the decrease in angular velocity is detected.

7. The method of claim 6, wherein the alarm is at least one of an audio alarm and a visual alarm.

8. The method of claim 1, further comprising:
displaying the first angle on a display device electrically connected to the processor of the digital angle meter.

9. The method of claim 1, further comprising:
displaying the total angle of rotation on a display device electrically connected to the processor of the digital angle meter.

10. The method of claim 1, wherein the second angle between the first angle position and the second angle position is stored on the memory of the digital angle meter.

11. The method of claim 1, wherein the third angle between the second angle position and the third angle position is stored on the memory of the digital angle meter.

12. The method of claim 1, wherein engaging a resistance position includes detecting an increase in torque required to continue to rotate the wrenching device in the first direction, wherein the increase in torque is detected by a sensor in communication with the processor.

13. The method of claim 1, further comprising detecting a pause in rotation at an end portion of the third rotation of the wrenching device by the processor of the digital angle meter, the pause indicating to the digital angle meter that the first resistance position has been engaged.

14. The method of claim 1, wherein the digital angle meter activates an alarm electrically connected to the processor to indicate that the digital angle meter recognizes that the first resistance position has been engaged.

15. A method of calculating a total angle of rotation of a wrenching device used to apply a torque to a fastening device rotating about a longitudinal axis, the wrenching device including a digital angle meter including a gyrometer, a processor, a memory, and logic stored on the memory, the method comprising:

detecting a rotation of the wrenching device about the longitudinal axis in a first direction from a reference angle position to a first angle position, wherein a first angle between the reference angle position and the first angle position is stored on the memory of the digital angle meter, and wherein a rotation of the fastening device in the first direction results in a tightening of the fastening device;

detecting a rotation of the wrenching device about the longitudinal axis in a second direction opposite to the first direction from the first angle position to a second angle position, wherein a second angle is formed between the first angle position and the second angle position;

detecting a rotation of the wrenching device about the longitudinal axis in the first direction from the second angle position to a third angle position, wherein a third angle between the second angle position and the third angle position is stored on the memory of the digital angle meter; and calculating a first aggregate angle of rotation by adding the first angle to the third angle, wherein the total angle of rotation is the first aggregate angle of rotation, and wherein the first aggregate angle of rotation is calculated by the processor of the digital angle meter.

16. The method of claim 15, further comprising:
automatically ignoring the second rotation of the wrenching device by the processor of the digital angle meter.

17. The method of claim 15, wherein a first resistance position is not detected by the processor of the digital angle meter during the rotation of the wrenching device about the longitudinal axis in the first direction from the second angle position to a third angle position.

18. A non-transitory computer-readable medium storing instructions to calculate a total angle of rotation of a wrenching device used to apply a torque to a fastening device rotating about a longitudinal axis, the instructions when executed by a processor cause the processor to:

detect with a gyrometer of a digital angle meter a first rotation of the wrenching device about the longitudinal axis in a first direction from a reference angle position to a first angle position;

store a first angle between the reference angle position and the first angle position on a memory of the digital angle meter;

detect with the gyrometer of the digital angle meter a second rotation of the wrenching device about the longitudinal axis in a second direction opposite to the first direction from the first angle position to a second angle position, wherein a second angle is formed between the first angle position and the second angle position;

detect with the gyrometer of the digital angle meter a third rotation of the wrenching device about the longitudinal axis in the first direction from the second angle position to a third angle position until engaging a first resistance position, wherein a third angle is formed between the second angle position and the third angle position;

detect with the gyrometer of the digital angle meter a fourth rotation of the wrenching device about the longitudinal axis in the first direction from the third angle position to a fourth angle position;

store a fourth angle between the third angle position and the fourth angle position on the memory of the digital angle meter; and calculate a first aggregate angle of rotation by adding the first angle to the fourth angle, wherein the total angle of rotation is the first aggregate angle of rotation.

19. The non-transitory computer-readable medium of claim 18, wherein instructions for detecting a third rotation of the wrenching device about the longitudinal axis in the first direction from the second angle position to a third angle position until engaging a first resistance position includes instructions for detecting an increase in torque of the wrenching device in the first direction.

20. The non-transitory computer-readable medium of claim 19, wherein the increase in torque is detected by a sensor in communication with the processor.

21. The non-transitory computer-readable medium of claim 20, wherein the pause is between one and five seconds.

22. The non-transitory computer-readable medium of claim 18, further comprising:

ignoring the second and third angle in response to a first user input.

23. The non-transitory computer-readable medium of claim 18, wherein the detecting with the gyrometer of the digital angle meter the fourth rotation of the wrenching device about the longitudinal axis in the first direction is based on a second user input.

24. The non-transitory computer-readable medium of claim 18, further comprising:

detect with the gyrometer of the digital angle meter a pause in rotation at an end portion of the third rotation of the wrenching device, the pause indicating to the digital angle meter that the first resistance position has been engaged.

25. The method of claim 24, wherein the pause is between one and five seconds.

26. The non-transitory computer-readable medium of claim 18, wherein the digital angle meter activates an alarm electrically connected to the processor to indicate that the digital angle meter recognizes that the first resistance position has been engaged.

* * * * *

UNITED STATES PATENT AND TRADEMARK OFFICE
CERTIFICATE OF CORRECTION

PATENT NO. : 8,918,292 B2  
APPLICATION NO. : 14/046677  
DATED : December 23, 2014  
INVENTOR(S) : James Wener It is certified that error appears in the above-identified patent and that said Letters Patent is hereby corrected as shown below:

In the Claims:

At Column 20, line 17, Claim 25, "The method of" should be
-- The non-transitory computer-readable medium of --.

Signed and Sealed this  
Third Day of November, 2015

Michelle K. Lee  
*Director of the United States Patent and Trademark Office*